Nov. 22, 1932.  V. E. HOFMANN  1,888,318
MECHANISM FOR FORMING HOLLOW GLASS ARTICLES
Filed May 8, 1930   5 Sheets-Sheet 1
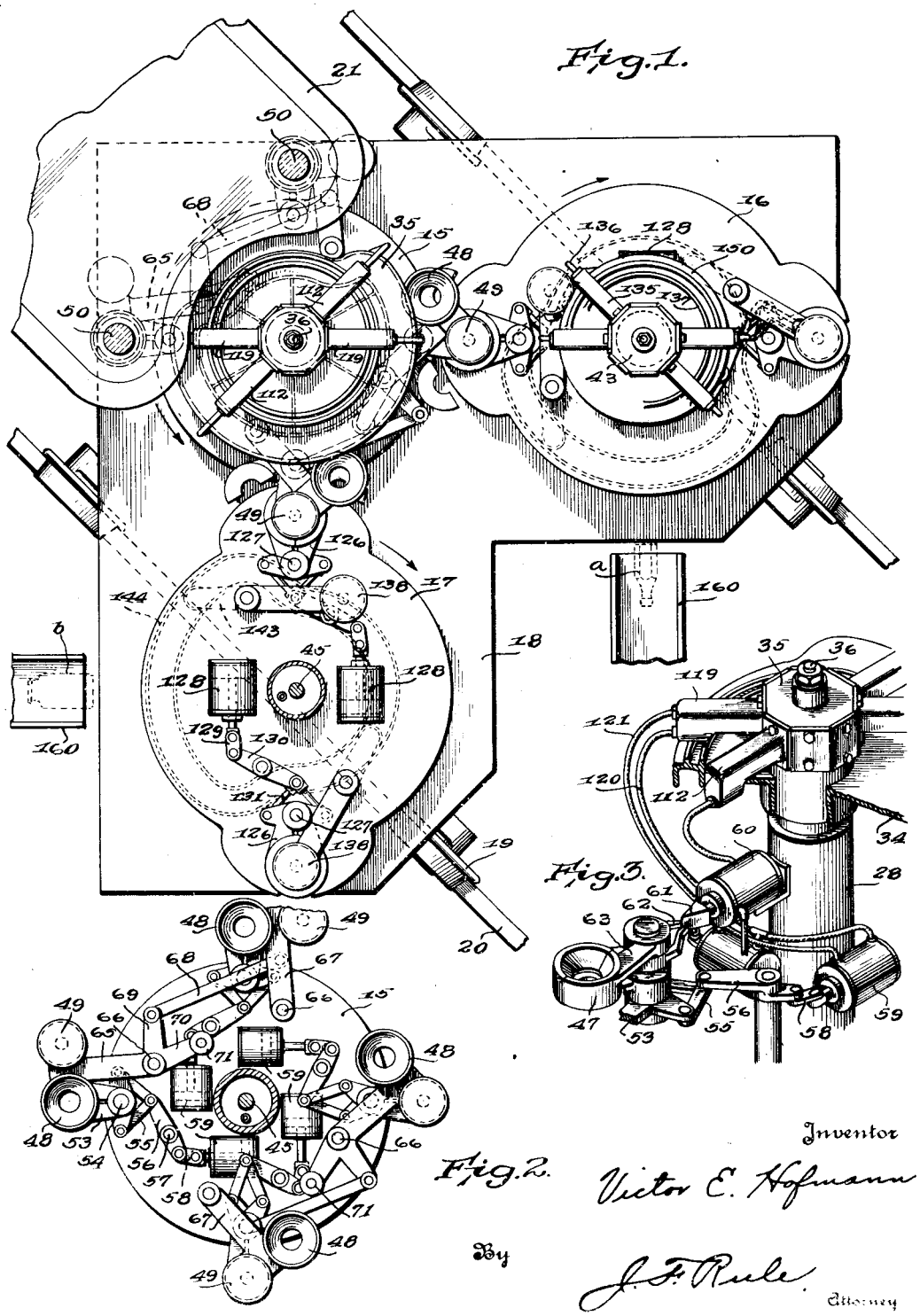
Inventor
Victor E. Hofmann
By J. F. Rule
Attorney

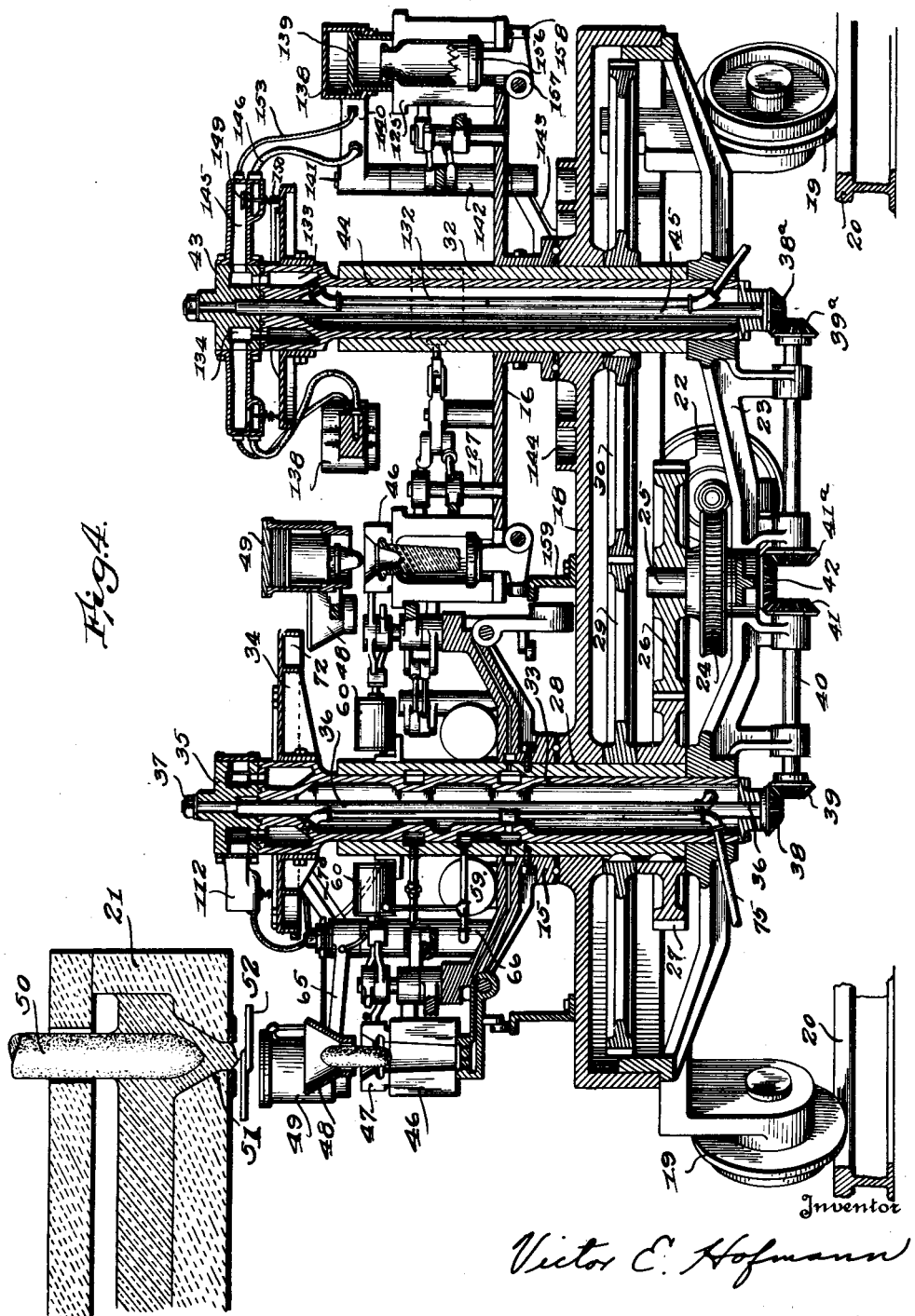

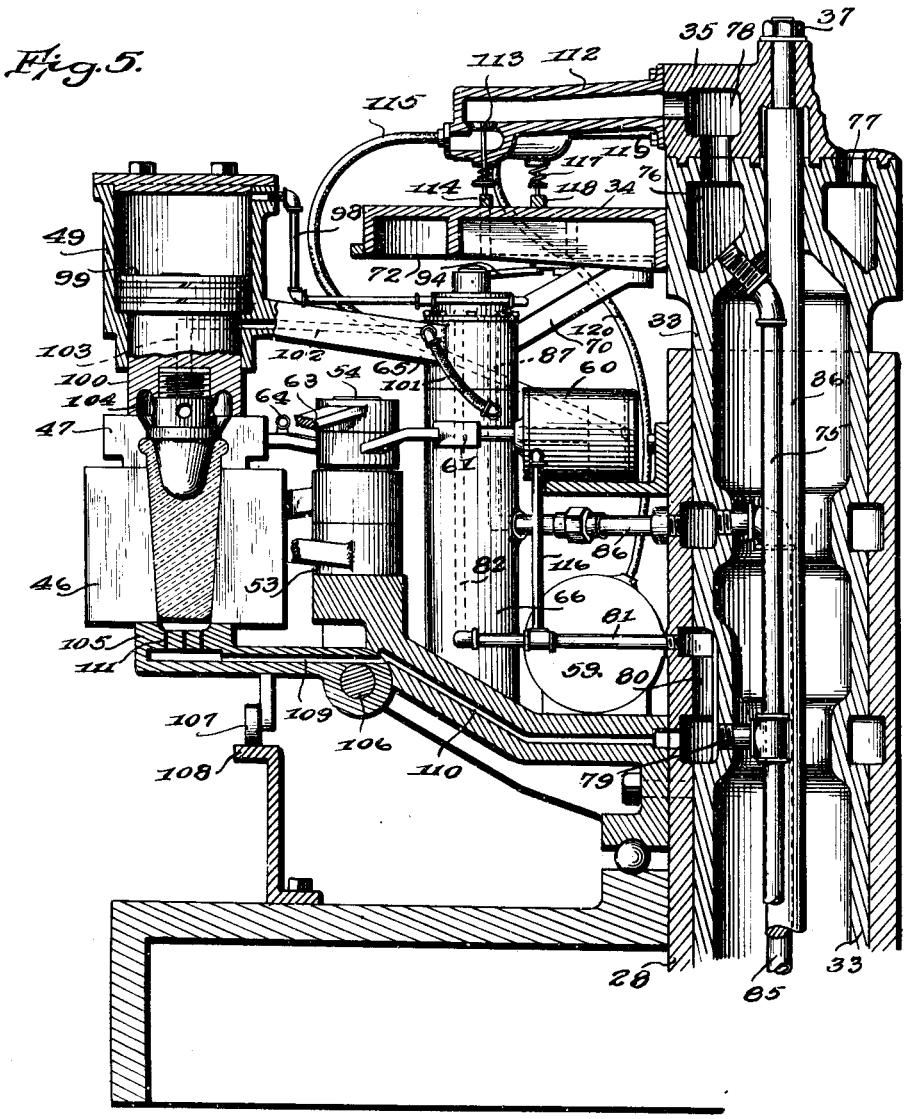

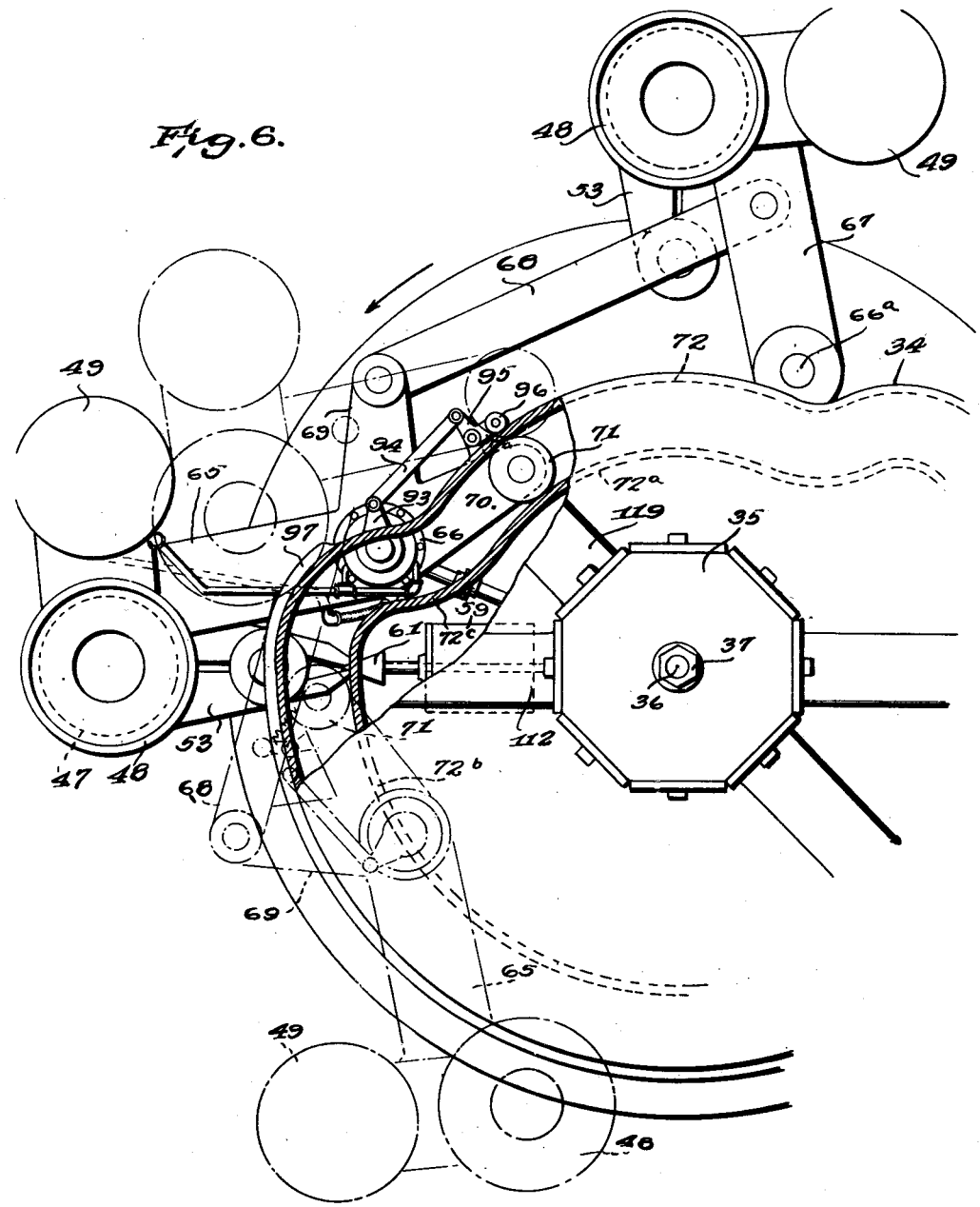

Nov. 22, 1932.  V. E. HOFMANN  1,888,318
MECHANISM FOR FORMING HOLLOW GLASS ARTICLES
Filed May 8, 1930   5 Sheets-Sheet 5
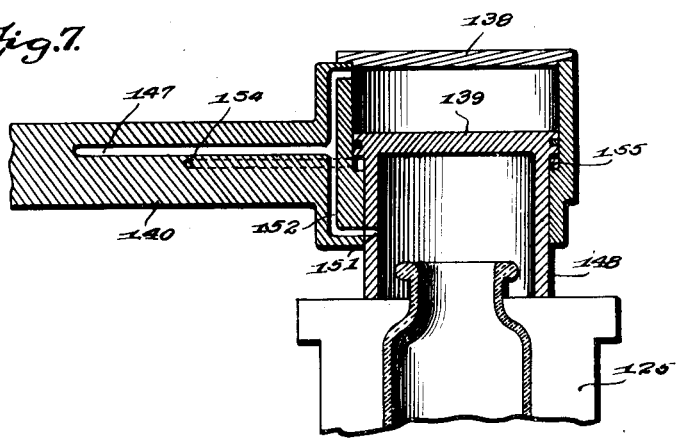
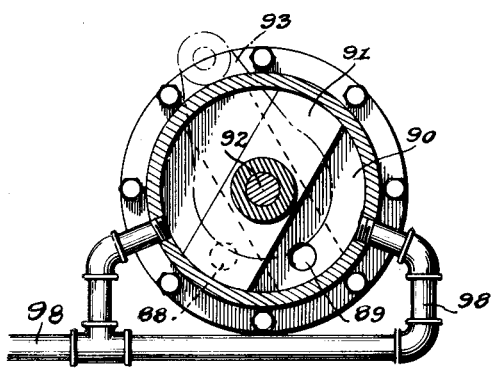
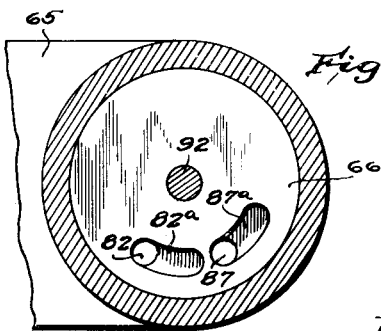
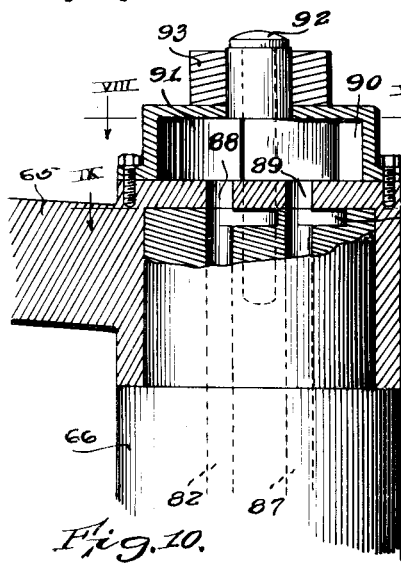
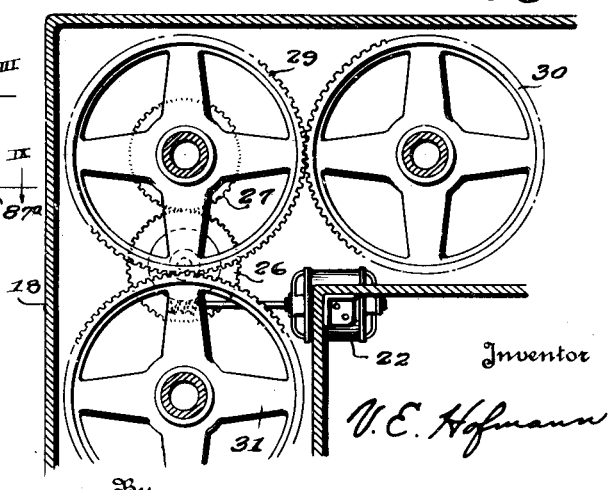
Inventor
V. E. Hofmann
By
J. F. Rule,
Attorney Patented Nov. 22, 1932

1,888,318

UNITED STATES PATENT OFFICE

VICTOR E. HOFMANN, OF TOLEDO, OHIO, ASSIGNOR TO OWENS-ILLINOIS GLASS COMPANY, A CORPORATION OF OHIO

MECHANISM FOR FORMING HOLLOW GLASS ARTICLES

Application filed May 8, 1930. Serial No. 450,717.

My invention relates to apparatus for forming hollow glassware such as bottles, jars and the like. An object of the invention is to provide apparatus for this purpose which is comparatively simple and efficient in operation and having large productive capacity.

The invention in its preferred form comprises a blank mold carriage rotatable about a vertical axis, blank molds thereon, a plurality of finishing mold carriages adjacent to the blank mold carriage and rotatable about separate axes, finishing molds on the finishing mold carriages, automatic means for simultaneously delivering charges of glass to a plurality of separate blank molds and forming parison therein, and automatic means for transferring the parisons from the blank molds to finishing molds, one on each of the finishing mold carriages.

Other objects of the invention and the precise nature thereof will appear more fully hereinafter.

In the accompanying drawings:

Fig. 1 is a plan view of an apparatus embodying the principles of my invention.

Fig. 2 is a sectional plan view of the blank mold carriage and the blank mold groups thereon.

Fig. 3 is a fragmentary perspective view showing a portion of the blank mold carriage and parts mounted thereon.

Fig. 4 is a sectional elevation view of the blowing machine and feeder, showing the relative position of parts at the moment charges of glass are being delivered to a pair of blank molds.

Fig. 5 is a sectional elevation on a larger scale, showing a portion of the blank mold carriage.

Fig. 6 is a top plan view showing a portion of the blank mold carriage and associated parts, the view being partly in section and partly diagrammatic.

Fig. 7 is a detail sectional elevation of one of the blowing heads on the finishing mold carriage.

Fig. 8 is a section at the line VIII—VIII on Fig. 10, showing a valve controlling the air and vacuum supply to a blank mold suction and blowing head.

Fig. 9 is a section at the line IX—IX on Fig. 10.

Fig. 10 is a part sectional elevation of a suction and blowing head arm and its mounting for the valve shown in Fig. 8.

Fig. 11 is a view showing the motor and gearing for driving the mold carriages.

The blowing machine (Fig. 1) comprises a blank mold carriage 15 and finishing mold carriages 16 and 17, said carriages being interconnected by driving gearing, as hereinafter set forth, to rotate in synchronism about vertical axes. The mold carriages are mounted on a wheel base or platform 18 carried on wheels 19 which run on tracks 20, so that the machine may be moved to and from an operative position relative to a feeder 21.

An electric motor 22 (Figs. 4 and 11) and the gearing for transmitting motion to the mold carriages are supported beneath the platform 18 on a supporting frame or structure 23. The motor shaft carries a worm which drives a worm gear 24 on a vertical shaft 25 to which is secured a driving pinion 26 running in mesh with a gear 27 secured to a hollow vertical shaft 28 to which the blank mold carriage 15 is secured. Directly above the gear 27 and fixed to the shaft 28 is a gear wheel 29 which runs in mesh with gear wheels 30 and 31 by which the finishing mold carriages 16 and 17 respectively are driven.

As shown in Fig. 4, the gear wheel 30 is fixed to the vertical shaft 32 of the mold carriage 16. It will be seen that continuous rotation of the motor 22 will operate through the gearing above described to continuously rotate the three mold carriages in synchronism about their vertical axes at the same peripheral speed, the gears 29, 30, and 31 being of equal diameter. The hollow rotating shaft 28 is mounted on a stationary hollow column or shaft 33 secured at its lower end in the base 23. The shaft 33 extends above the shaft 28 and has secured adjacent its upper end a stationary cam plate 34. An air distributing head 35 is mounted for rotation on the upper end of the shaft 33. A shaft 36 extends centrally through the hollow shafts 28 and 33 and is secured at its upper end to the head 35 by means of a clamping nut 37. On the lower end of the shaft 36 is keyed a bevel gear 38 running in mesh with a pinion 39 on a shaft 40 journaled in the frame 23. A gear 41 on the shaft 40 runs in mesh with a gear 42 on the lower end of the shaft 25. The gears are so proportioned that the shaft 36 is rotated at the same angular speed as the blank mold carriage, thereby rotating the distributing head 35 with the carriage.

Associated with each finishing mold carriage is an air distributing head 43 mounted for rotation on the upper end of a stationary hollow shaft 44 which extends through the hollow shaft 32. The head 43 is fixed to a drive shaft 45 extending centrally of the hollow shafts 32 and 44. The shaft 45 is driven through suitable gearing comprising gears $38^a$, $39^a$ and $41^a$, in the same manner as the shaft 36, whereby the distributing head 43 is rotated at the same angular speed as the finishing mold carriage.

Mounted on the blank mold carriage 15 are blank mold groups each comprising a partible body blank mold 46 and a partible neck mold 47 directly above and in register with the blank mold. Associated with each blank mold group is a funnel guide 48 for directing charges of glass into the blank mold, and a suction head 49, means being provided for periodically bringing said head and the funnel guide of each group alternately into operative position over the mold as hereinafter set forth. I have herein shown four mold groups on the blank mold carriage, although a greater or less number might be employed, said groups in turn being arranged in pairs.

Charges of glass are automatically delivered simultaneously to a pair of molds from the feeder 21 which, as shown, comprises two plungers 50 adapted to be periodically reciprocated over the outlets 51 in the floor of the feeder, and shears 52 which are operated in the usual manner to sever the charges of glass. As the blank mold carriage rotates, the two blank molds of a pair are simultaneously brought to a charge receiving position directly beneath the feeder outlets, the funnel guides 48 being in position over the molds. The shears now operate to sever the charges of glass and permit them to drop into the guides through the molds. It will be understood that the feeder mechanism is operated in synchronism with the rotation of the mold carriage by any usual or approved mechanism (not shown).

The sections of each blank mold 46 are carried on a pair of arms 53 mounted on a pivot pin 54. Links 55 connect the mold arms with a lever 56 fulcrumed at 57 and connected through a link 58 with the piston rod of an air motor 59 so that reciprocation of the motor piston opens and closes the blank mold. The neck molds 47 are opened by means of air operated piston motors 60. The piston rod of each motor 60 carries a V-shaped head 61 which engages between lugs 62 formed on the neck mold arms 63, the latter being journaled on the pivot pin 54. When the piston of the motor 60 is moved outward, the head 61 wedges or cams the lugs 62 apart, thereby opening the neck mold. When the piston is withdrawn, the neck mold is closed as by means of a coil spring 64 (Fig. 5).

One of the funnel guides 48 and one of the heads 49 of each pair of mold groups are mounted on the outer end of a T-shaped arm of a lever 65 fulcrumed on a post 66. The other guide 48 and head 49 for said pair of molds, are carried on a T-arm 67 pivoted on a post $66^a$. A link 68 connects the arm 67 with an arm 69 on the lever 65. The lever 65 includes an arm 70 carrying a cam roll 71 which runs in a cam track 72 formed on the lower face of the stationary cam plate 34, and thereby determines the positions of the guide 48 and head 49 relative to the mold carriage.

Referring to Fig. 6, which shows the funnel guides 48 and heads 49 for one pair of mold groups in full lines in one position and in broken lines in a more advanced position, it will be seen that in the full line position the funnel guides 48 are directly over the blank molds. This position of the guides 48 and heads 49 relative to the mold carriage is determined by the cam section $72^a$ in which the roll 71 is traveling at this time. When the cam roll 71 is traveling in the dwell portion $72^b$ of the cam as indicated in broken lines, the funnel guides 48 and heads 49 are in the position, relative to the mold carriage, shown in broken lines, in which position said heads are directly over and in register with the molds. Shortly after a pair of blank molds has passed beyond the charge receiving position beneath the outlets 51 of the feeder and receive their charges of glass, the cam roll 71 runs through an operating section $72^c$ of the cam, thereby swinging the heads 49 into position.

The vacuum and air pressure system for applying suction and air pressure within the blank mold and for operating the air motors on the blank mold carriage will now be described. An air pressure pipe 75 connected to any constant source of air pressure (not shown) extends upward through the interior of the central stationary column 33 and opens into a pressure chamber 76 in the head of said column. Said chamber is in constant communication through ports 77 with an air chamber 78 formed in the distributing head 35. Air under pressure is distributed from the chamber 78 to the air motors 59 and 60, as hereinafter set forth, for actuating the blank molds and neck molds respectively. A branch pipe 79 (Fig. 5) leads from pipe 75 to an air passage 80 formed between the rotating shaft 28 and the stationary shaft 33. Air pressure pipes 81 lead from the passage 80 to passageways 82 extending upward through the posts 66 (see Fig. 10). A vacuum pipe 85 connected to any suitable source of vacuum or subatmospheric pressure, extends upward through the center column 33 and communicates with pipes 86 which extend to vacuum passageways 87 in the post 66.

Referring to Figs. 5 and 10, it will be seen that the arm 65, which is journaled on the reduced upper end of the post 66, is formed with ports 88 and 89 which register respectively with the air pressure and vacuum passageways 82 and 87. Said ports provide communication between said passageways and a valve chamber 90 (see also Fig. 8) in which is a valve 91. The passageways 82 and 87 are provided at their upper ends with lateral extensions 82ª and 87ª so that the swinging movement of the arm 65 will not cut off communication with the ports 88 and 89. The valve 91 is mounted to swing about a pivot pin 92 from the full line position, Fig. 8, in which it closes the port 88, to the dotted line position in which it closes the port 89, thereby opening the air and vacuum lines alternatively to the valve chambers. The valve 91 is actuated by means of a rock arm 93 (see Fig. 6), connected through a link 94 to a bell crank 95 which is mounted on the lever arm 70 and carries a cam roll 96 adapted to run at times on the outer surface of the cam track 72 and at times on a cam 97 formed on the outer surface of the cam track 72. While the funnel guides 48 are over the blank molds the roll 96 is running along the cam section 72ª and the valve 91 is held in the position shown in Figs. 8 and 10, so that the valve chamber is open to the vacuum line. This line is continued from the valve chamber through a pipe 98 which leads to the upper end of the suction head 49. Said head comprises a piston motor including a piston 99 which carries a plunger 100. The pipe 98 being connected with the vacuum line as just described, the piston 99 and plunger 100 are held in the uppermost position.

As the cam roll 71 (Fig. 6) travels through the operating section 72ᶜ of its cam for swinging the heads 49 over the blank mold, the cam roll 96 runs onto the cam 97 and thereby reverses the valve 91 (Figs. 8 and 10) so that the vacuum line is closed at the port 89 and the port 88 is opened, thereby connecting the air pressure line 82 to the pipe 98. Air under pressure is therefore transmitted through the pipe 98 to the head 49 and lowers the plunger as shown in Fig. 5. When the plunger is thus lowered, it seats on the neck mold 47 and the plunger tip is projected downward into and through the neck mold, compressing the glass and shaping it in the neck mold. When the plunger is thus lowered, a vacuum line is established to the neck mold. This line extends from the passageway 87 through a flexible pipe section 101 (Fig. 5) to a passageway 102 extending through the arm 65 to a passageway 103 formed in the plunger and extending to an annular recess or chamber 104 opening downward to the neck mold around the plunger tip. The suction thus applied at the neck mold assists in shaping the neck of the parison and compacting the glass in the mold.

Cooperating with each blank mold is a mold bottom plate 105 connected to the mold carriage by a horizontal hinge pin 106. A roll 107 on the bottom plate 105 runs on a cam track 108 which is positioned and arranged to lift the bottom plate against the blank mold about the time the plunger 100 is lowered to seat on the neck mold. When the bottom plate is brought up to the mold, an air channel 109 therein is brought into register with an air pressure line 110 leading from the pipe 75. A series of perforations 111 in the bottom plate directly beneath the blank mold cavity, permit the air pressure to be applied to the lower end of the parison, thereby assisting in compacting the glass in the mold and shaping the parison.

The piston motors 60 for opening the neck molds are actuated by air pressure supplied through the distributing head 35. Attached to said head are radially disposed hollow arms 112. In the outer end of each arm is a valve 113 actuated by a cam 114 on the stationary cam plate 34. When said valve is opened air under pressure is admitted to a pipe 115 leading to the inner end of the air motor 60. Air pressure is therefore applied behind the piston and operates the motor for opening the neck mold, as heretofore described. When the valve 113 is opened, the piston of the motor 60 is returned by the constant air pressure which is maintained in front of the piston through a branch pipe 116 leading from the pipe 81.

The air motors 59 for actuating the body blank molds are controlled by valves 117 (Fig. 5) actuated by a cam 118 in substantially the same manner as just described in connection with the air motors 60. The valve 117 is mounted in a hollow arm 119 communicating with the chamber 78 in the distributing head. The air line is continued from the valve 117 through a flexible pipe 120 (Figs. 3 and 5) to the inner ends of the pair of motors 59. Continuous air pressure is supplied to the motors 59 in front of the pistons, through a pipe 121 extending from the arm 119.

Each of the finishing mold carriages 16 and 17 carries a single finishing mold 125 for each pair of blank molds on the carriage 15, there being in the machine herein illustrated, two finishing molds on each finishing mold carriage. The two finishing mold carriages and the mechanisms carried thereby are substantially identical in construction, so that a description of one such carriage and mechanism will serve for both. Each finishing mold comprises a pair of horizontally reciprocable sections carried on arms 126 fulcrumed on a pivot pin 127. Each finishing mold is opened and closed by means of a piston motor 128 operating through a link 129, lever 130 and links 131 connected to the mold arms. Air under pressure for operating the motors 128 is supplied from any suitable source through a pressure pipe 132 (Fig. 4) extending upward through the center column of the mold carriage and opening into a pressure chamber 133 which is in constant communication with the air chamber 134 of the distributing head 43. The air is distributed from said head through radial arms 135 (Fig. 1) and pipes 136 leading to the motors 128. The air connections from the distributing head to the motors 128 may be substantially like those heretofore described for the motors 49 which operate the blank molds. A cam 137 (Fig. 1) actuates the valves which control the motors 128.

Associated with each finishing mold is a blowing head 138 comprising a piston motor having a piston 139. The head 138 is carried by an arm 140 fixed to a vertical pivot shaft 141 journaled in a post 142 on the mold carriage. Secured to the lower end of the shaft 141 is an arm 143 carrying a cam roll which runs in a stationary cam track 144 formed on the base plate 18. Said cam track is shaped to swing the blowing head horizontally to and from a position over the finishing mold.

When the blowing head 138 is over the finishing mold, the piston 139 is lowered so that a blowing cylinder 148 extending downward from the piston, is caused to seat on the mold. Air pressure for lowering the piston is supplied from the chamber 134 through radial arms 145 and pipe connections 146 extending to the arm 140 and communicating with a channel 147 (see Fig. 7) in said arm, which channel opens into the blowing head above the piston 139. When the blowing cylinder 148 seats on the mold it encloses the neck portion of the parison which protrudes above the mold. The supply of air to the blowing head is controlled by a valve 149 actuated by a stationary cam 150. When the blowing cylinder is lowered to seat on the mold, a port 151 in said cylinder is brought into register with a channel 152 branching from the channel 147 (Fig. 7) so that air under pressure is supplied to the blowing head for expanding the parison in the finishing mold. When the blowing operation is completed, the valve 149 closes and the blowing head is lifted by means of air pressure which is constantly maintained beneath the piston 139, said pressure being supplied through a pipe 153 (Fig. 4) leading from the arm 145 to a channel 154 in the arm 140, said channel opening into the confined space 155 beneath the piston 139.

Associated with each finishing mold is a mold bottom plate 156 carried on a bell crank lever 157 pivoted on the mold carriage and carrying a roll 158 adapted to run on a cam track 159. The track is so positioned and shaped that it lifts the bottom plate to a horizontal position before the mold closes. When the mold closes, it holds the bottom plate in position. When the finishing mold opens, the mold bottom tilts by gravity to discharge the blown article into a chute 160.

*Operation*

Referring to Fig. 1, the blank mold carriage 15 and the finishing mold carriages 16 and 17 are rotated continuously in the directions indicated by the arrows, by means of the motor 22 and gearing shown in Fig. 11. Each pair of blank molds 46 is thereby brought in turn to a charging position in which the two blank molds of a pair are beneath the feeder outlets. The two feeders operate to deliver simultaneously charges of glass through the funnel guides 48 to the blank molds 46 and neck molds 47, said molds being closed at this time and the funnel guides in register therewith. As soon as the charges of glass have been received in the molds, the carriers for the funnel guides 48 and suction heads 49 (see Fig. 6) are swung laterally to move the guides out of line with the molds and bring the suction heads into position. This operation is effected by the cam roll 71 running through the operating section 72ᶜ of the cam 72, thereby rocking the arm 65 which carries one funnel guide and blow head, and through the link 68 rocking the arm 67 carrying the other guide and blow head of a pair. As soon as the heads 49 are in position over the molds, the valve 91 (Fig. 8) is actuated by its cam 97 as heretofore described to establish an air pressure line to the head 49 and above the piston 99 so that the plunger 100 is lowered and seats on the mold. This establishes a vacuum line from the mold through the channel 102, pipe 101 and pipes 86, 85, so that suction is applied through the neck mold for shaping the neck of the parison and compacting the glass in the mold. This operation is assisted by air under pressure supplied from the pressure pipe 75 to the mold bottom, this pressure line being automatically established by the movement of the mold bottom into engagement with the blank mold. This movement of the mold bottom to operative position may take place concurrently with the lowering of the suction head onto the neck mold.

When the formation of the parison in the blank mold is completed, the cam 97 operates to reverse the valve 91, thereby connecting the pipe 98 with the vacuum channel 87 so that the plunger 100 is lifted. The air motors 59 now operate to open the blank molds 46, leaving the bare parisons suspended from the neck molds 47. The two parisons are brought simultaneously to the transfer positions in which each parison is at the center line joining the axis of the blank mold carriage and the corresponding finishing mold carriage. As a parison reaches the transfer position, the corresponding finishing mold closes around it. At the same time, the neck mold is opened by means of its motor 60, thus completing the transfer.

When the transfer of the parisons is completed, the cam 144 operates to swing the blowing heads 138 to a position over the finishing molds. The valves 149 are then opened to supply air to the blowing heads above the pistons 139, thereby lowering the air cylinders 148 (see Fig. 7) and establishing air pressure lines to said cylinders through the ports 151 so that the parisons are blown to finished form. When the blown articles are cooled sufficiently, the finishing molds are opened by their air motors 128, permitting the mold bottoms to tilt and discharge the articles into the chutes 160.

It will be noted that each blank mold receives all its charges from the same feeder or feeder outlet. In other words, two of the blank molds receive their charges from one feeder, and the other two blank molds from the other feeder. Also, the blank molds which receive their charges from one feeder, deliver all of said charges to the finishing molds on one carriage. This arrangement permits one of the feeders to supply charges of a predetermined size and shape suited for the formation of a bottle or other article of predetermined size and shape in the finishing molds on one carriage, and charges of a different size and shape for the articles to be formed in the other finishing molds. Thus, as shown, for example, in Fig. 1, narrow neck bottles *a* are formed in the molds on the carriage 16, whereas, wide mouth jars *b* of larger size are formed in the molds on carriage 17.

Modifications may be resorted to within the spirit and scope of my invention.

What I claim is:

1. In apparatus for forming glass articles, the combination of a blank mold carriage, blank molds thereon, finishing mold carriages, a finishing mold on each finishing mold carriage, and automatic means for simultaneously transferring parisons from the blank molds to said finishing molds.

2. In apparatus for forming glass articles, the combination of a blank mold carriage, blank molds thereon, finishing mold carriages, a finishing mold on each finishing mold carriage, means for rotating all of said carriages in synchronism about separate vertical axes, and means for transferring parisons from the blank molds to the finishing molds.

3. In apparatus for forming glass articles, the combination of a blank mold carriage, blank molds thereon, finishing mold carriages, a finishing mold on each finishing mold carriage, means for rotating all of said carriages in synchronism about separate vertical axes, and simultaneously bringing all of said molds to transfer positions, and automatic means for simultaneously transferring parisons from the blank molds to the finishing molds.

4. The combination of a blank mold carriage, blank molds thereon, finishing mold carriages, finishing molds thereon, means to rotate each said mold carriage about a separate vertical axis, the blank molds being arranged in pairs, and automatic means for simultaneously transferring parisons from one pair of blank molds to finishing molds on the respective finishing mold carriages.

5. In an apparatus for forming glass articles, the combination of a plurality of feeders for delivering charges of molten glass, finishing mold carriages individual to said feeders, molds on each of said carriages, interconnecting mechanism for driving the carriages in synchronism, and blank forming means common to said carriages for receiving charges of glass from the feeders and transferring them to the molds, all of the charges from each feeder being delivered to the molds on the carriage individual to said feeder.

6. In an apparatus for forming glass articles the combination of a blank mold carriage rotatable about a vertical axis, blank molds thereon, a feeder operable to periodically deliver charges of molten glass to predetermined molds on said carriage, a second feeder operable to periodically deliver charges of molten glass to other of the molds on said carriage, finishing mold carriages, finishing molds thereon, and automatic means for transferring to the finishing molds on one finishing mold carriage all of the charges delivered from one feeder and for transferring to the molds on the other finishing mold carriage all of the charges delivered from the other feeder.

7. In an apparatus for forming glass articles the combination of a blank mold carriage rotatable about a vertical axis, blank molds thereon, a feeder operable to periodically deliver charges of molten glass to predetermined molds on said carriage, a second feeder operable to periodically deliver charges of molten glass to other of the molds on said carriage, finishing mold carriages, finishing molds thereon, means for simultaneously transferring parisons from blank molds to finishing molds on the respective finishing mold carriages, all of the parisons delivered to each finishing mold being produced from mold charges supplied from the same feeder.

8. In an apparatus for forming glass articles, the combination of a blank mold carriage, blank molds thereon arranged in pairs, a plurality of feeders, means for rotating said carriage and thereby bringing the molds of each pair simultaneously to charge receiving positions beneath the respective feeders, said feeders operable to simultaneously deliver charges of glass to the respective molds of the pair, finishing mold carriages, finishing molds on each finishing mold carriage, and means for simultaneously transferring blanks from the pair of blank molds to molds on the respective finishing mold carriages.

9. In an apparatus for forming glass articles, the combination of a blank mold carriage, blank molds thereon, said carriage being rotatable about a vertical axis, finishing mold carriages, finishing molds on each of the finishing mold carriages, means for rotating said carriages including gearing interconnecting the carriages and proportioned to drive all of the carriages at the same angular speed, means for forming parisons in the blank molds, and means for transferring the parisons from the blank molds to the finishing molds.

10. In an apparatus for forming glass articles, the combination of a blank mold carriage, blank molds thereon, said carriage being rotatable about a vertical axis, finishing mold carriages, finishing molds on each of the finishing mold carriages, means for rotating said carriages including gearing interconnecting the carriages, means for forming parisons in the blank molds, and means for transferring the parisons from the blank molds to the finishing molds.

11. In an apparatus for forming glass articles, the combination of a blank mold carriage, blank molds thereon, said carriage being rotatable about a vertical axis, finishing mold carriages, finishing molds on each of the finishing mold carriages, means for rotating said carriages including gearing interconnecting the carriages, means for forming parisons in the blank molds, and means for transferring the parisons from the blank molds to the finishing molds, the molds being so arranged that all of the parisons formed in each blank mold are delivered to a mold or molds on the same finishing mold carriage.

12. In a machine for forming glass articles, the combination of a mold carriage rotatable about a vertical axis, an annular series of molds thereon, a stationary cam, mechanism actuated by said cam for opening and closing alternate molds of said series, and mechanisms connecting each said alternate mold to an adjacent mold of the series for simultaneously operating said adjacent mold whereby the molds are operated in pairs.

13. In a machine for forming glass articles, the combination of a mold carriage rotatable about a vertical axis, an annular series of molds thereon, said molds arranged in pairs, a stationary cam, means actuated by the cam for opening and closing one mold of each pair, and mechanism connecting the molds of each pair whereby one mold of a pair is operated by said cam the other mold of the pair is simultaneously operated.

Signed at Toledo, Ohio, this 22 day of April, 1930.

VICTOR E. HOFMANN.